(12) United States Patent
Mueller et al.

(10) Patent No.: US 11,486,264 B2
(45) Date of Patent: Nov. 1, 2022

(54) METHOD FOR CONTROLLING AND LIMITING A SPEED OF A TURBOCHARGER

(71) Applicant: Volkswagen Aktiengesellschaft, Wolfsburg (DE)

(72) Inventors: Sven Mueller, Hannover (DE); Tobias Noesselt, Hannover (DE); Mauro Calabria, Peine (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/319,685

(22) Filed: May 13, 2021

(65) Prior Publication Data
US 2021/0355842 A1 Nov. 18, 2021

(30) Foreign Application Priority Data
May 13, 2020 (DE) .................. 10 2020 205 991.8

(51) Int. Cl.
*F01D 17/16* (2006.01)
*F02D 23/00* (2006.01)

(52) U.S. Cl.
CPC ............. *F01D 17/16* (2013.01); *F02D 23/00* (2013.01); *F05D 2220/40* (2013.01); *F05D 2270/02* (2013.01); *F05D 2270/304* (2013.01)

(58) Field of Classification Search
CPC .......... F01D 17/16; F02B 37/12; F02B 37/18; F02B 37/24; F02B 39/16; F02B 2037/122; F02B 2039/168; F02D 23/00; F02D 41/0007; F02D 41/1401; F02D 41/22; F02D 2041/1417; F02D 2041/1433; F02D 2200/0402; F02D 2200/0406;
(Continued)

(56) References Cited

U.S. PATENT DOCUMENTS 4,907,409 A * 3/1990 Inoue ...................... F02B 37/12
60/602
7,805,938 B2 * 10/2010 Roh ........................ F02B 37/24
60/602
(Continued)

FOREIGN PATENT DOCUMENTS

DE 102005012946 A1 9/2006
DE 102008044156 A1 6/2010
(Continued)

*Primary Examiner* — Audrey B. Walter
*Assistant Examiner* — Dapinder Singh
(74) *Attorney, Agent, or Firm* — Muncy, Geissler, Olds & Lowe, P.C.

(57) ABSTRACT

A method for controlling a speed of a turbocharger that is in operative connection with a compressor, the steps including: provision of a setpoint for the speed of the turbocharger on the basis of a model-based precontrol for a calculation of a desired boost pressure ahead of the turbocharger; determination of an actual value for the speed of the turbocharger; control of an actuator of the turbocharger in order to compensate for the difference between the desired value and the actual value for the speed of the turbocharger. A main signal and a subsidiary signal are provided during the determination of the actual value for the speed of the turbocharger, wherein the main signal and the subsidiary signal are combined in order to validate the actual value for the speed of the turbocharger.

11 Claims, 7 Drawing Sheets

(58) Field of Classification Search
CPC ........ F02D 2200/0414; F02M 35/1038; F02M 35/10386; F05D 2220/40; F05D 2270/02; F05D 2270/304; Y02T 10/12
See application file for complete search history.

(56) References Cited

U.S. PATENT DOCUMENTS

| | | | |
|---|---|---|---|
| 9,267,426 B2* | 2/2016 | Makino | F02D 41/0007 |
| 9,523,331 B2* | 12/2016 | Ibuki | F02D 41/0007 |
| 2013/0042609 A1 | 2/2013 | Cianflone et al. | |
| 2014/0227109 A1* | 8/2014 | Wang | F02B 37/24 |
| | | | 417/53 |
| 2019/0063347 A1* | 2/2019 | Xiao | F02D 41/26 |

FOREIGN PATENT DOCUMENTS

| | | |
|---|---|---|
| DE | 102015210226 A1 | 12/2016 |
| DE | 102016012019 A1 | 4/2018 |

\* cited by examiner

METHOD FOR CONTROLLING AND LIMITING A SPEED OF A TURBOCHARGER

This nonprovisional application claims priority under 35 U.S.C. § 119(a) to German Patent Application No. 10 2020 205 991.8, which was filed in Germany on May 13, 2020 and which is herein incorporated by reference.

BACKGROUND OF THE INVENTION

Field of the Invention

The present invention relates to a method for controlling a controlled variable in operation of a turbocharger. In addition, the invention relates to a turbocharger for operating a compressor. Moreover, the invention relates to a computer program product according to the independent product claim

Description of the Background Art

Turbochargers are known that are arranged downstream of a direction of exhaust gas flow of an internal combustion engine in order to convert the thermal heat energy and the kinetic energy of the exhaust gases into mechanical power. This mechanical power can be used in turn to operate a compressor that provides combustion air to the internal combustion engine. The faster the engine operates, the faster the turbocharger rotates as well. The faster the turbocharger rotates, the more air the compressor delivers, which in turn accelerates the turbocharger as a result of the increasing quantity of exhaust gas. At a certain speed, the turbocharger reaches a load limit, however, which is to say a maximum permissible speed, which can lead to mechanical damage, such as, e.g., high friction, and/or thermal damage, such as, e.g., overheating, of the turbocharger.

Modern boost pressure control methods are based on physical models of the air path, such as, e.g., a compressor model. In this case, component limits are maintained by limiting the boost pressure setpoint and/or while taking into account a turbocharger speed modeled by a compressor model. However, in the event of leakage in an intake system of the compressor, the modeled fresh air mass flow is estimated too low. The boost pressure controller will load the exhaust turbocharger more heavily to compensate for the escaping air in this case. However, the risk exists here that the exhaust turbocharger will be driven beyond its load limit. As a result, a small sealing problem in the intake path (e.g., in the case of a missing or defective O-ring) can lead to substantial damage to the exhaust turbocharger. In many cases, a direct connection of a turbocharger speed sensor in the control system is not easily possible, because an overdetermined system would result (one regulating variable with two control targets). Known boost pressure control methods therefore cannot function robustly for all operating conditions. Either they intervene improperly in a system without leakage (power loss), or the turbocharger speed is not robustly limited in the case of leakage (risk of component damage).

SUMMARY OF THE INVENTION

It is therefore an object of the present invention to at least partially overcome the above-described disadvantages in a method for controlling a controlled variable in operation of a turbocharger. In particular, it is the object of the present invention to provide a method for controlling a controlled variable in operation of a turbocharger, in particular a speed of a turbocharger, that can be carried out simply, with little cost, and with little computing power in order to operate the turbocharger in a robust and safe manner under all operating conditions and to reliably protect it from exceeding its load limit. It is also the object of the invention to provide a corresponding turbocharger for operating a compressor. Moreover, the object of the invention is to provide a corresponding computer program product.

The object according to the invention is attained by a method for controlling, and in particular limiting, a speed of a turbocharger. In addition, the object according to the invention is attained by a turbocharger for operating a compressor. Moreover, the object according to the invention is attained by a computer program product.

To attain the object, the invention provides a method for controlling, and in particular limiting, a speed of a turbocharger that is in operative connection with a compressor, comprising the following steps: Provision of a setpoint for the speed of the turbocharger on the basis of a model-based precontrol for a calculation of a desired boost pressure ahead of the turbocharger, which is to say with the aid of a model-based precontrol for a calculation of a desired boost pressure ahead of the turbocharger and a conversion of the desired boost pressure ahead of the turbocharger into the setpoint for the speed of the turbocharger; Determination of an actual value for the speed of the turbocharger; and/or Control of an actuator of the turbocharger (a wastegate or adjustable guide vanes can be used as the actuator in the case of gasoline engines, and adjustable guide vanes in the case of diesel engines) in order to compensate for the difference between the desired value and the actual value for the speed of the turbocharger, wherein a main signal and a subsidiary signal are provided during the determination of the actual value for the speed of the turbocharger in step 2), wherein the main signal and the subsidiary signal are combined in order to validate the actual value for the speed of the turbocharger.

The function that reflects the value of the speed as a function of time can be understood as a signal within the meaning of the invention.

The invention recognizes here that the load limit of the turbocharger, which is to say the maximum permissible speed of the turbocharger, is not taken into account, or at least is not taken sufficiently into account, when the boost pressure is being controlled. Model-based precontrol includes a mathematical model for the calculation of a desired boost pressure ahead of the turbocharger (or of a desired boost pressure of the compressor). This mathematical model is based on the known Euler turbine equation. The desired boost pressure ahead of the turbocharger can be calculated in this case for a desired output of the turbocharger, for example.

A feature of the invention here is that the speed of the turbocharger, and not the boost pressure of the turbocharger, is used as the controlled variable in controlling a controlled variable in operation of a turbocharger. In so doing, the maximum permissible speed of the turbocharger can be taken into account directly, or in other words can be included in the control, for example as a maximum settable setpoint for the speed of the turbocharger. To obtain the setpoint for the speed of the turbocharger, the desired boost pressure ahead of the turbocharger is calculated from the known model-based precontrol and is converted into a setpoint for the speed of the turbocharger. The desired boost pressure should thus be understood as an input variable. The setpoint for the turbocharger speed can be calculated here while taking into account a compressor model.

The invention introduces a new approach for determining the actual value for the speed of the turbocharger. The core concept here is the validation of the modeled actual value for the speed of the turbocharger by the comparison of two signals and the provision of a combined actual value for the speed of the turbocharger for further use in the controller.

The main signal for the speed of the turbocharger can be derived from the compressor model in this case. A subsidiary signal for the speed of the turbocharger can be taken from either a turbine model or a sensor value. In a system without leakage in the intake path, these speed signals correlate with one another. In the case of leakage, the main signal takes on lower values than the subsidiary signal, because the subsidiary signal is not affected by the leakage.

The invention provides a combined speed in step 2), in which the main signal is validated by means of the subsidiary signal. The invention advantageously intervenes in the speed control loop in the event of discrepancies between the main signal and the subsidiary signal that can be attributed to leakage. In the event of leakage, the main speed can be increased. Thus, a robust prevention of overspeeds independently of the instantaneous operating situation is made possible with the aid of the invention. At the same time, the intervention in the control loop takes place in such a manner that repercussions on the dynamic behavior of the closed loop (especially with respect to stability and the tendency to oscillate) are minimized.

The combined speed can be determined as follows, for example:

1. A minimum and a maximum threshold are calculated as a function of the main signal. A leakage factor is produced by comparison of the main signal and the subsidiary signal, for example as follows:

If the subsidiary signal is less than the minimum threshold, a leakage factor equal to 0 is calculated.

If the subsidiary signal is greater than the maximum threshold, a leakage factor equal to 1 is calculated.

If the subsidiary signal is between the two thresholds, a leakage factor is interpolated between 0 and 1.

2. A combined speed signal is produced as a function of the leakage factor. This can be implemented with the aid of a Kalman filter, for example, whose parameters are determined as a function of the leakage factor. In this way an improved method for controlling the speed of the turbocharger can be provided which can be carried out simply, with little cost, and with little computing power.

In addition, the invention can provide, in a method for controlling a speed of a turbocharger, that a setpoint limiting for the speed of the turbocharger takes place in the provision of the setpoint for the speed of the turbocharger in step 1). In this process, a maximum permissible speed of the turbocharger as the limit value can advantageously be taken into account. As a result of taking the desired turbocharger speed into account, it is advantageously possible to cap the pressure-based value with a mechanical limit value so that the controller can control precisely to this limit value when this limit is reached. This ensures that the limit value represents the instantaneous limit both dynamically and in the steady state.

In addition, the invention can provide, in a method for controlling a speed of a turbocharger, that the actual value for the speed of the turbocharger is captured, in other words is measured and/or sensed, in the subsidiary signal in step 2). A speed sensor can be provided for this purpose. In this way, it is made possible for a real speed value of the turbocharger to be taken directly into account in the speed control process. Moreover, in this way the real speed of the turbocharger can be included in the regulation to a notable degree in the setpoint limiting. Even long-term effects on the turbocharger that cannot be reflected by the model-based precontrol, such as contamination or wear of the turbocharger, can be taken into account by including the real speed value of the turbocharger in the control.

Furthermore, the invention can provide, in a method for controlling a speed of a turbocharger, that the actual value for the speed of the turbocharger is provided in the subsidiary signal from, or by means of, a turbine model in step 2). The turbine model can be based on a characteristic map, for example, and can represent the speed of the turbine as a function of an air mass flow and/or speed ratios ahead of and behind the turbine. With the aid of a turbine-model-based calculation of the speed for the turbocharger, a speed sensor can be eliminated, wherein the subsidiary signal is modeled with the aid of the turbine model. In this case, too, it is possible to ensure that a subsidiary signal is provided that is not affected by any leakage in the intake line ahead of the compressor.

Moreover the invention can provide, in a method for controlling a speed of a turbocharger, that the actual value for the speed of the turbocharger is provided in the main signal from or by means of a compressor model, in particular with the aid of a conversion from a detected actual boost pressure of the compressor or actual boost pressure ahead of the turbocharger, in step 2). The actual value for the speed of the turbocharger can advantageously be calculated in a manner analogous to the setpoint for the speed of the turbocharger, preferably with the aid of the same conversion or with the same gain factor. The same software and/or hardware as used for the existing controls can be used for this purpose.

Additionally the invention can provide, in a method for controlling a speed of a turbocharger, that the same mathematical model, in particular the compressor model, and/or the same parameters is/are used in operation of the turbocharger for the setpoint for the speed of the turbocharger in step 1) and for the actual value for the speed of the turbocharger in the main signal in step 2). In this way, a consistency can be established in the pressure path through the turbocharger.

According to another advantage of the invention, at least one thermodynamic quantity can be used or taken into account as a parameter in operation of the turbocharger, such as a temperature ahead of the compressor, a pressure ahead of the compressor, and/or a mass flow of an intake air through the compressor, in step 1) and/or in step 2). In this way the real circumstances that can affect the boost pressure and/or the speed of the turbocharger can be taken into account in operation of the turbocharger.

The object according to the invention is also attained by a turbocharger for operating a compressor, which can serve to supply combustion air to an internal combustion engine. According to the invention, the turbocharger has a control unit that is designed to control the operation of the turbocharger in accordance with a method that can be carried out as described above. The control unit can be implemented in an engine controller of the internal combustion engine or as a separate control unit of the turbocharger in this case. The same advantages can be achieved with the aid of the turbocharger according to the invention that have been described above in connection with the method according to the invention. Reference is made in full to these advantages in the present case.

Furthermore, in order to attain the object, the invention provides a computer program product that can be stored in a storage device of the above-described control unit and that, when at least partially executed in a computing unit of the control unit, performs a method that can proceed as described above. The same advantages can also be achieved with the aid of the computer program product according to the invention that have been described above in connection with the method according to the invention. Reference is likewise made in full to these advantages in the present case.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the various figures, the same features of the invention are always provided with the same reference symbols, for which reason these are only described once as a general rule.

Figure 1:
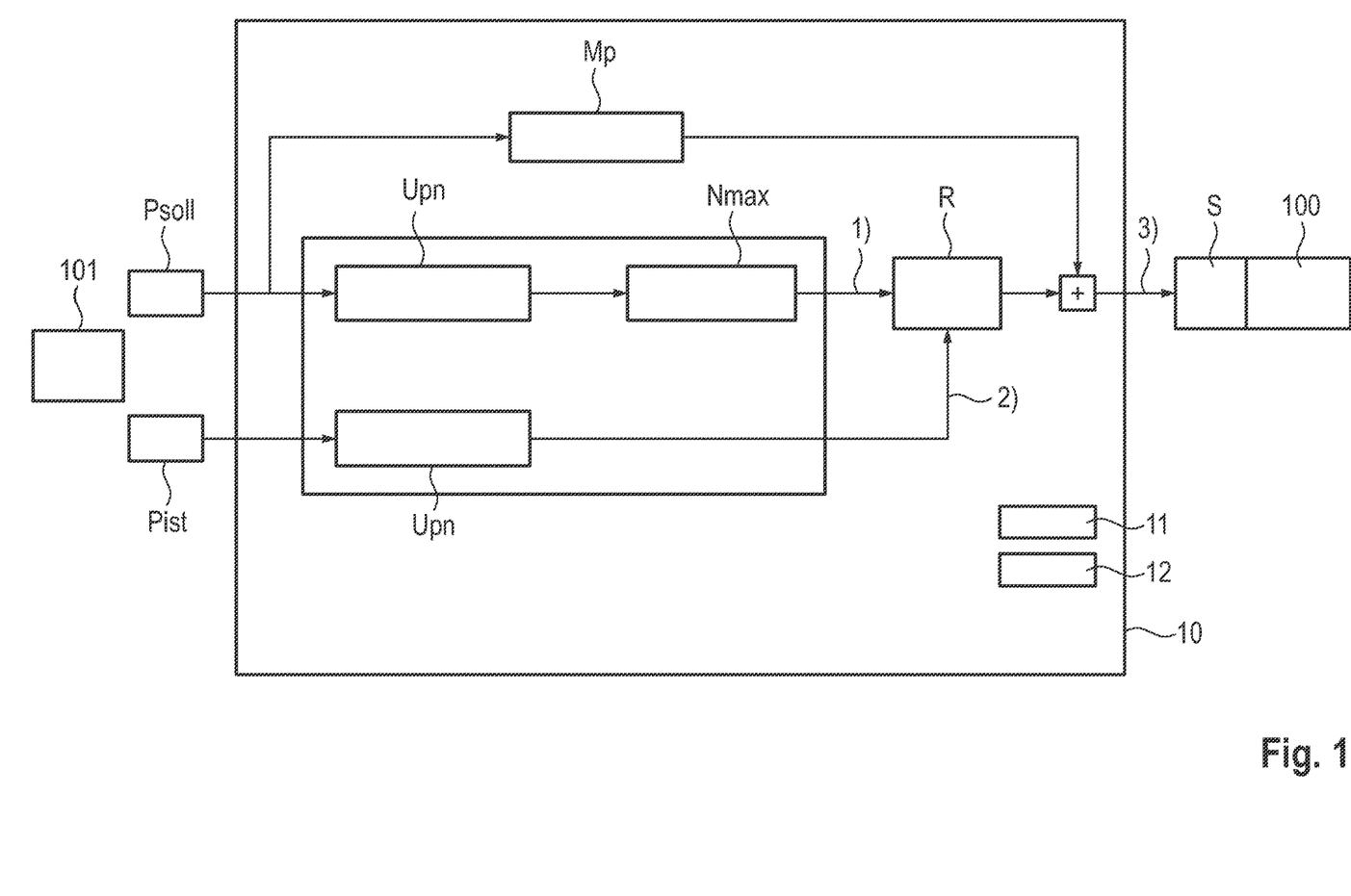
FIG. 1 shows a schematic flowchart of a possible control method within the meaning of the invention in which the speed of a turbocharger is controlled as the controlled variable.

FIG. 1 schematically shows the principle of a control R of a speed N in operation of a turbocharger 100 for a compressor 101, in which the speed N as the controlled variable is derived from a compressor model VM for a boost pressure P of a turbocharger 100.

The goal of the control R is that the turbocharger 100 provides sufficient output at low exhaust gas flows and to the extent possible does not exceed its load limit, in particular its maximum permissible speed N, at high speeds, and specifically under different operating conditions, even in the event of leakages L in the intake system of the compressor 101.

FIG. 1 schematically shows the sequence of a possible method within the meaning of the invention for controlling R, and in particular limiting, of a speed N of a turbocharger 100 that is in operative connection with a compressor 101, comprising the following steps:

1) Provision of a setpoint Nsoll for the speed N of the turbocharger 100 on the basis of a model-based precontrol Mp for a calculation of a desired boost pressure Psoll ahead of the turbocharger 100, which is to say with the aid of a model-based precontrol Mp for a calculation of a desired boost pressure Psoll ahead of the turbocharger 100 and a conversion Upn of the desired boost pressure Psoll ahead of the turbocharger 100 into the setpoint Nsoll for the speed N of the turbocharger 100, 2) Determination of an actual value Nist for the speed N of the turbocharger 100, 3) Control of an actuator S of the turbocharger 100 in order to compensate for the difference between the desired value Nsoll and the actual value Nist for the speed N of the turbocharger 100.

Figure 4:
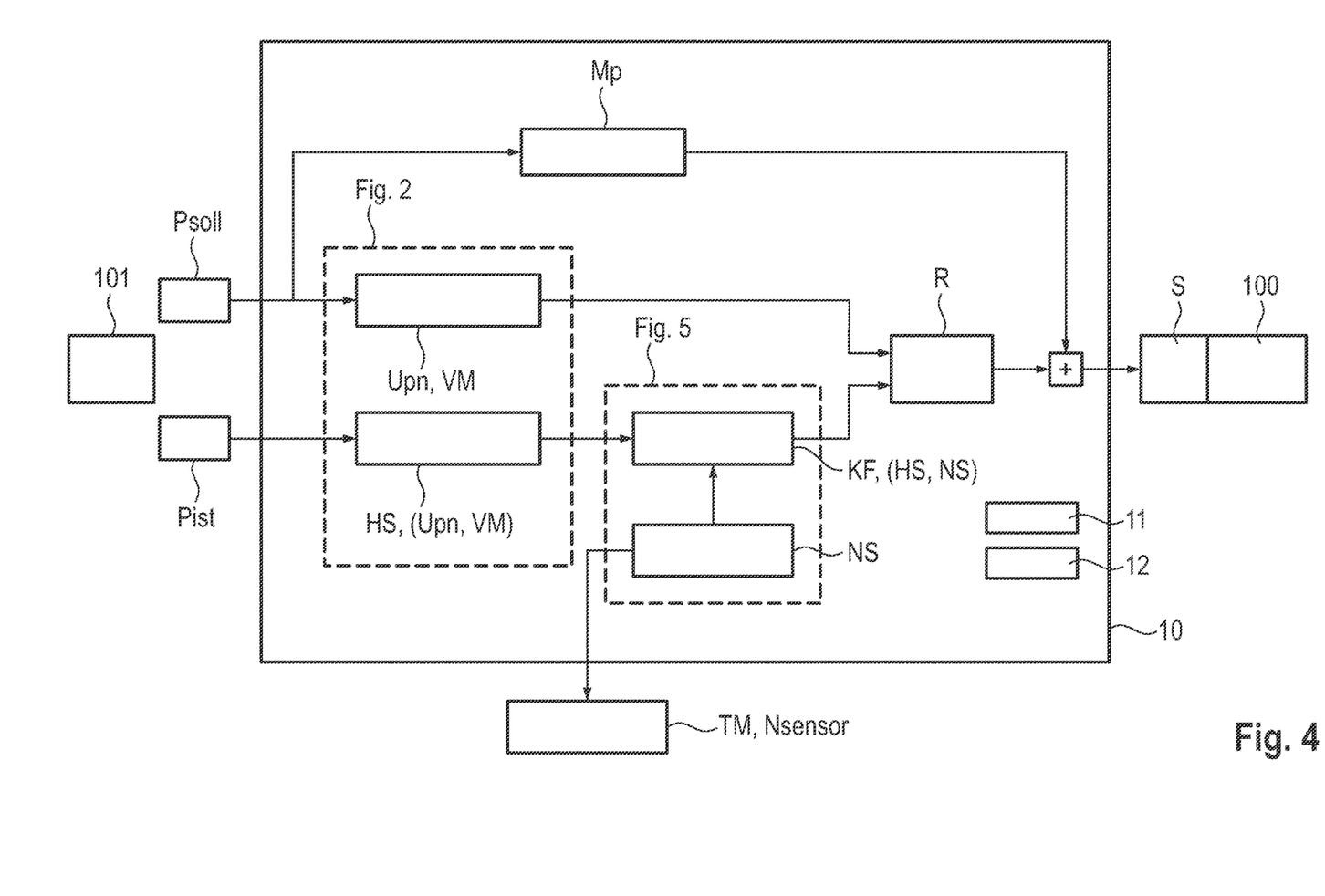
FIG. 4 shows a schematic flowchart of a control method according to the invention, in which the speed of the turbocharger is controlled as the controlled variable.
Figure 5:
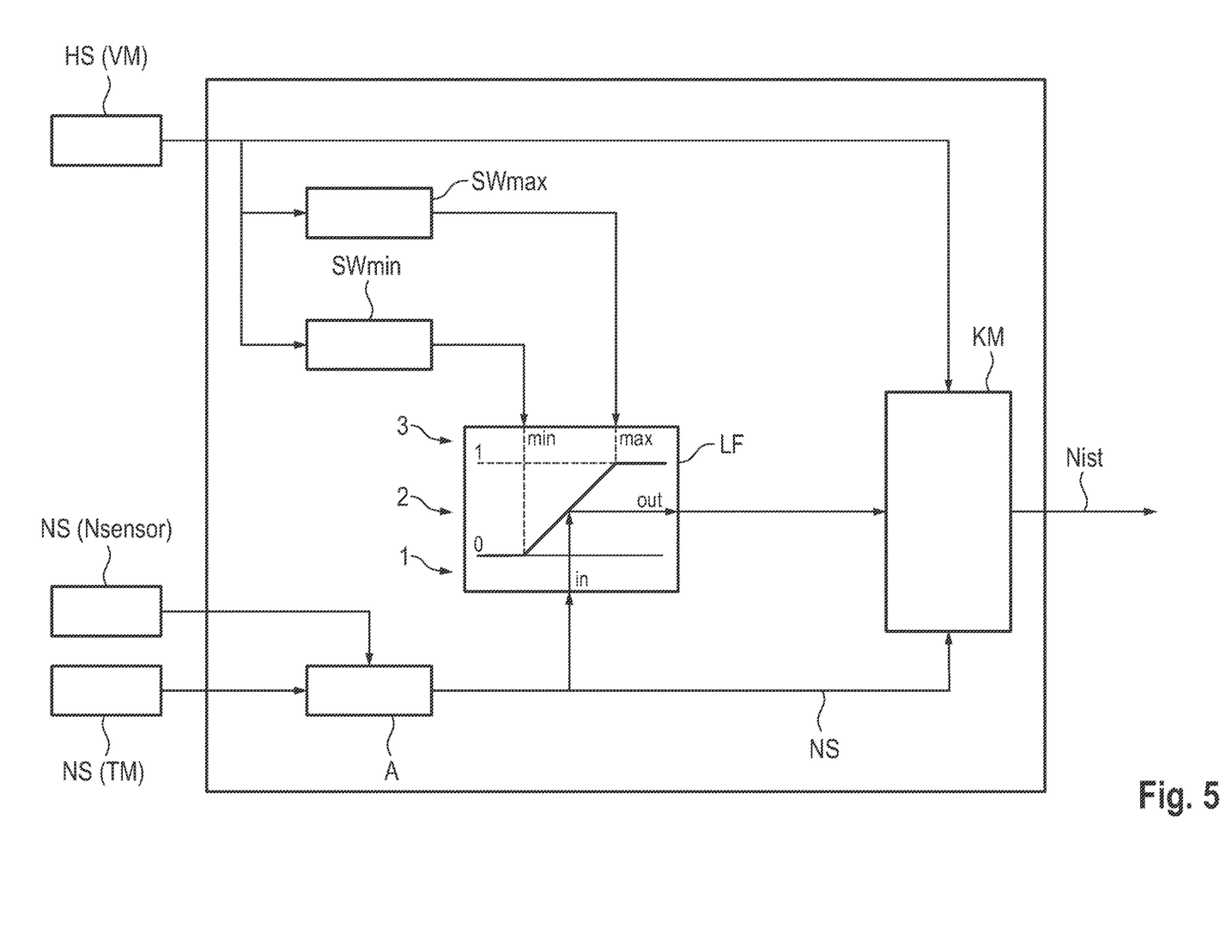
FIG. 5 shows a schematic explanation of a combination of an actual value for a speed of a turbocharger within the scope of the invention.
Figure 6:
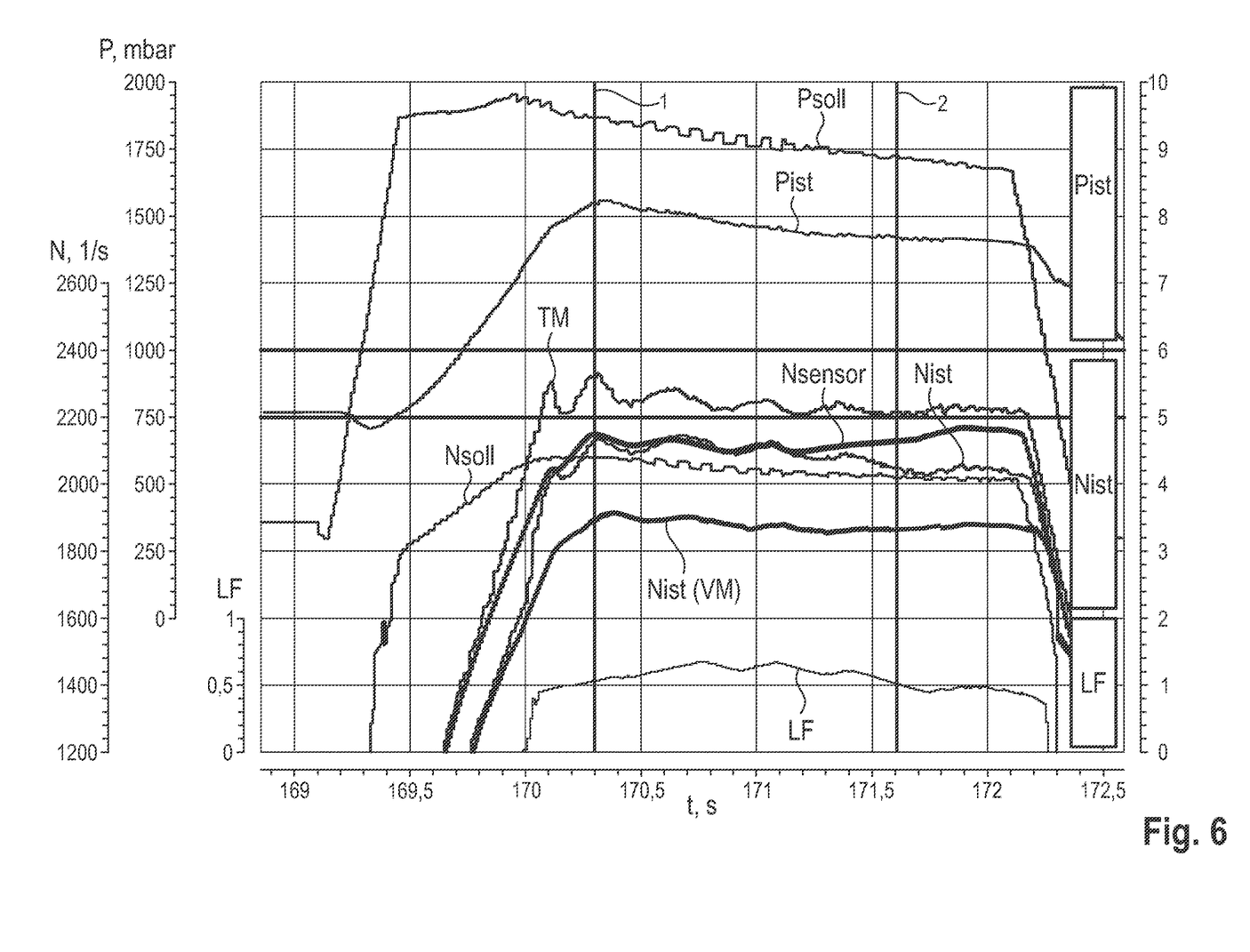
FIG. 6 shows a diagram for a control according to the invention.

According to the invention, a main signal HS and a subsidiary signal NS are provided during the determination of the actual value Nist for the speed N of the turbocharger 100 in step 2), wherein the main signal HS and the subsidiary signal NS are combined as shown in FIGS. 4, 5, and 6 in order to validate the actual value Nist for the speed N of the turbocharger 100.

Figure 2:
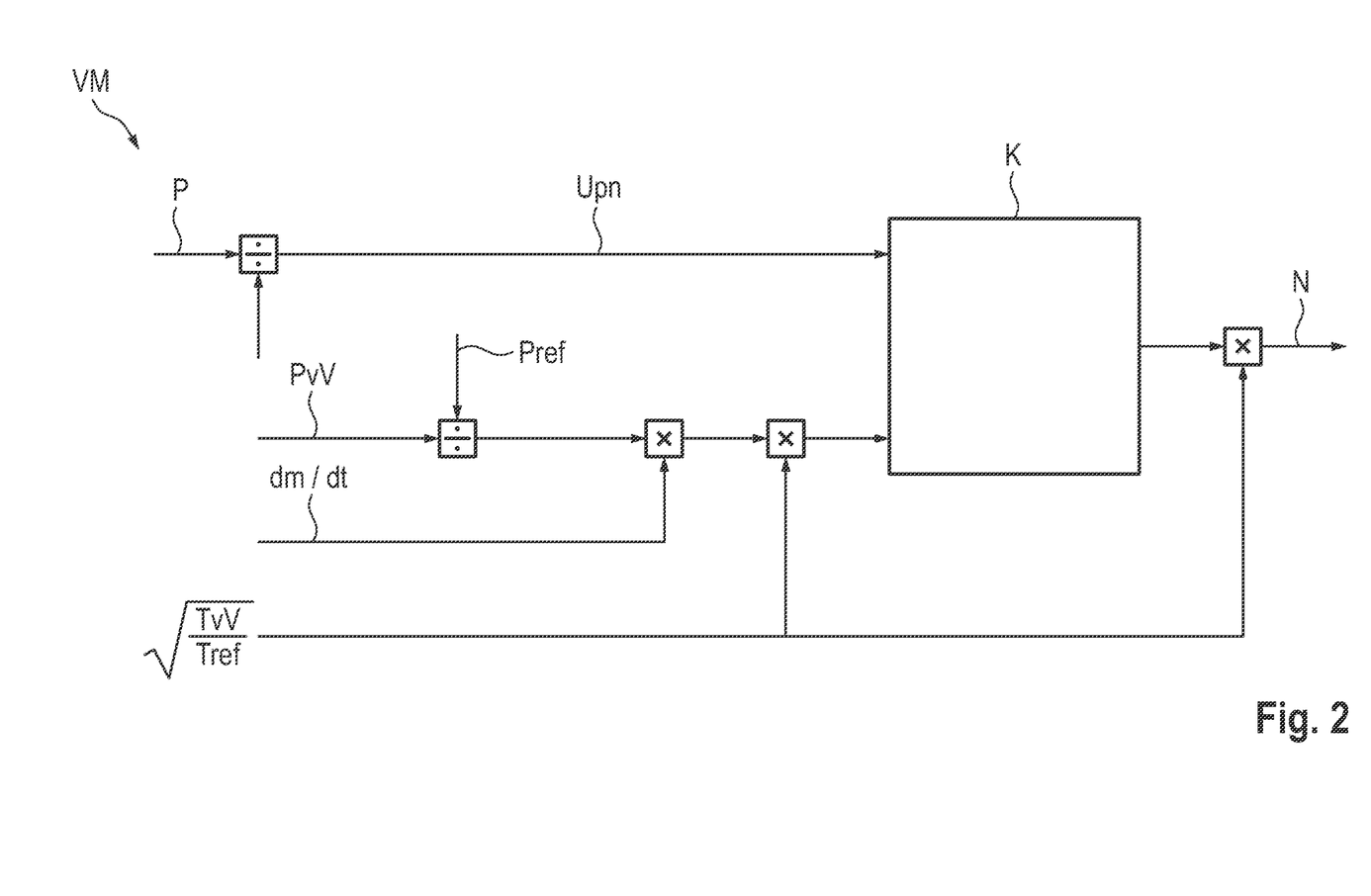
FIG. 2 shows a schematic flowchart of a compressor model.

The invention proposes here, firstly, to use the speed N of the turbocharger 100, and not the boost pressure P ahead of the turbocharger 100, as the controlled variable in the control R of a controlled variable in operation of a turbocharger 100 (see FIGS. 1 and 2). In this instance, the maximum permissible speed Nmax of the turbocharger 100 can be taken directly into account, or in other words be included in the control, for example as a maximum settable setpoint Nsoll for the speed N of the turbocharger 100 (see FIG. 2). To obtain the setpoint Nsoll for the speed N of the turbocharger 100, the desired boost pressure Psoll ahead of the turbocharger 100 is calculated from the known model-based precontrol Mp and is converted into a setpoint Nsoll for the speed N of the turbocharger 100 (an exemplary conversion Upn according to a compressor model VM can be seen in FIG. 2).

Moreover, an actual value Nist for the speed N of the turbocharger 100 is ascertained within the scope of the invention from two signals HS, NS (see FIGS. 4, 5, and 6) as a combined actual value Nist for the speed N of the turbocharger 100. As shown in particular by FIGS. 4, 5, and 6, a validation of the actual value Nist modeled in step 2) for the speed N of the turbocharger 100 is carried out within the scope of the invention by comparison of two signals HS, NS.

The main signal HS for the speed N of the turbocharger 100 can still be derived from the compressor model VM. A subsidiary signal NS for the speed N of the turbocharger 100 can be obtained from either a turbine model TM or a sensor value Nsensor, as is indicated by FIGS. 4 and 5.

Figure 3:
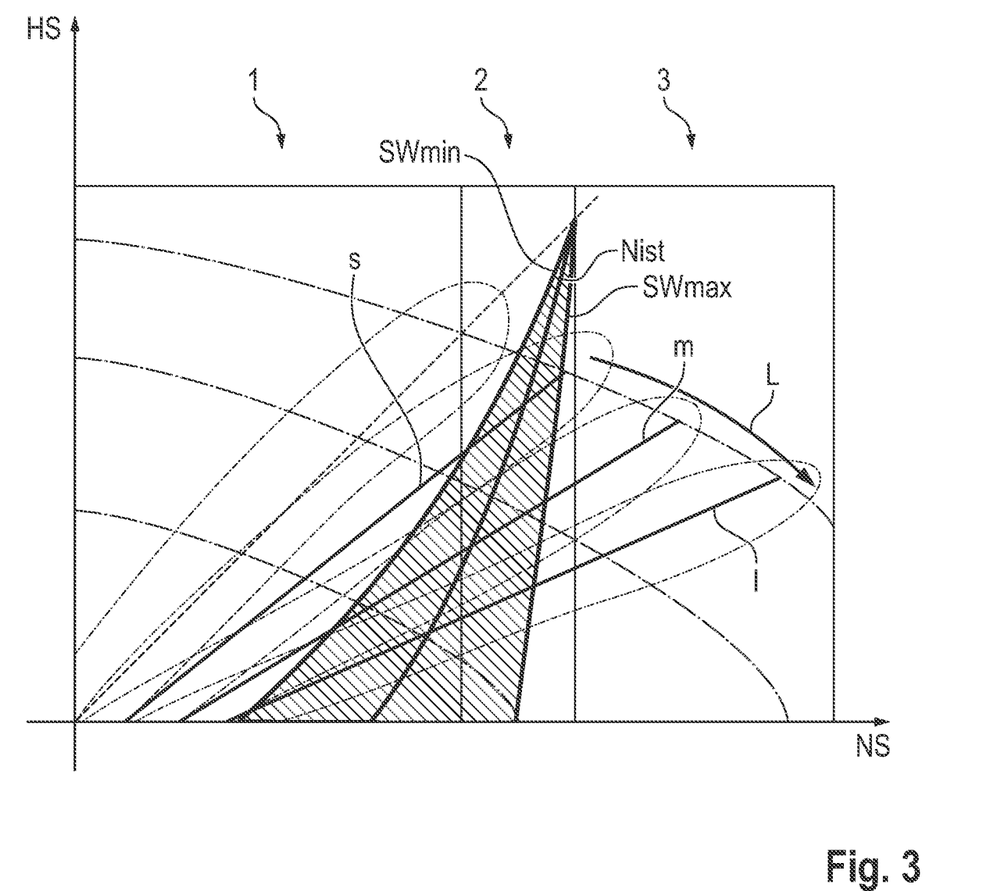
FIG. 3 shows a schematic representation of a main signal and of a subsidiary signal within the meaning of the invention.

As is shown in FIG. 3, these speed signals HS, NS correlate with one another in a system with no leakage L in the intake path ahead of the compressor 101. In the case of leakage L in the intake path ahead of the compressor 101, the main signal HS takes on smaller values than the subsidiary signal NS, because the subsidiary signal NS is not affected by the leakage L.

In FIG. 3, three regions 1, 2, 3 are indicated in this regard: a permissible region 1 (no leakage s), a limit region 2 (possible or moderate leakage m), and an impermissible region 3 (large leakage l).

As is indicated in FIGS. 3 and 5, the actual value Nist for the speed N of the turbocharger 100 can be set essentially equal to the main signal HS in the permissible region 1. In the limit region 2, the main signal HS can advantageously be raised. In the impermissible region 3, the actual value Nist for the speed N of the turbocharger 100 can be determined to be essentially equal to the subsidiary signal NS.

As is indicated in FIG. 5, the invention intervenes in the speed control loop according to FIG. 1 in the event of discrepancies between the main signal HS and the subsidiary signal NS that can be attributed to a leakage L.

The actual value Nist of the combined speed Nist can, as shown in FIG. 5, be determined as follows:

1. A minimum threshold SWmin and a maximum threshold SWmax are determined as a function of the main signal HS (see FIG. 3).

A leakage factor LF is produced by comparison of the main signal HS and the subsidiary signal NS, e.g. as follows:

If the subsidiary signal NS is less than the minimum threshold SWmin, a leakage factor equal to 0 is produced.

If the subsidiary signal NS is greater than the maximum threshold SWmax, a leakage factor equal to 1 is produced.

If the subsidiary signal NS is between the two thresholds SWmin and SWmax, a leakage factor is interpolated between 0 and 1.

2. A validated actual value Nist of the combined speed N is produced as a function of the leakage factor LF.

As is indicated in FIG. 5, the validated actual value Nist of the combined speed N can be determined, for example with the aid of a Kalman filter KF whose parameters are determined as a function of the leakage factor LF.

A robust prevention (see FIG. 6) of overspeeds Nist>Nmax (see FIG. 7) independently of the instantaneous operating situation is made possible with the aid of the invention. At the same time, the intervention in the control loop takes place in such a manner that repercussions on the dynamic behavior of the closed control loop with respect to stability and the tendency to oscillate are minimized.

A setpoint limiting for the speed N of the turbocharger 100 can advantageously take place in step 1) in the provision of the setpoint Nsoll for the speed N of the turbocharger 100, in which setpoint limiting the maximum permissible speed Nmax of the turbocharger 100 is taken into account as the limit value. Due to the control R of the speed N, it is advantageously possible to cap the pressure-based value of the speed N with a mechanical limit value so that the controller can control precisely to this limit value when this limit is reached.

According to FIG. 2, it is possible that the same mathematical model, in particular the compressor model VM, and/or the same (thermodynamic) parameters is/are used in operation of the turbocharger 100 for the setpoint Nsoll for the speed N of the turbocharger 100 in step 1) and the actual value Nist for the speed N of the turbocharger 100 in the main signal HS in step 2). The compressor model VM and the parameters used are explained with the aid of FIG. 2.

As FIG. 2 shows, the following thermodynamic quantities can be used or taken into account as parameters in operation of the turbocharger 100 in the conversion Upn of the boost pressure P into the boost speed N of the turbocharger 100: a pressure PvV ahead of the compressor 101, a mass flow dm/dt of an intake air through the compressor 101 as well as a temperature ahead of the temperature TvV ahead of the compressor 101. As is shown in FIG. 2, these parameters are incorporated into the speed N of the turbocharger 100 by means of a characteristic map K.

FIG. 6 shows a control R within the meaning of the invention in the case of a leakage L in which has been ascertained as a subsidiary signal NS through a turbine model TM. At the same time, it is possible that the speed N for the subsidiary signal NS can be sensed. According to FIG. 5 it is also possible that both options can contribute to forming the subsidiary signal NS in the framework of a choice A in the control R. Since the controller now uses a combined speed Nist that is greater than the setpoint Nsoll, the boost pressure control deviation (~300 mbar) is not compensated by the controller.

Figure 7:
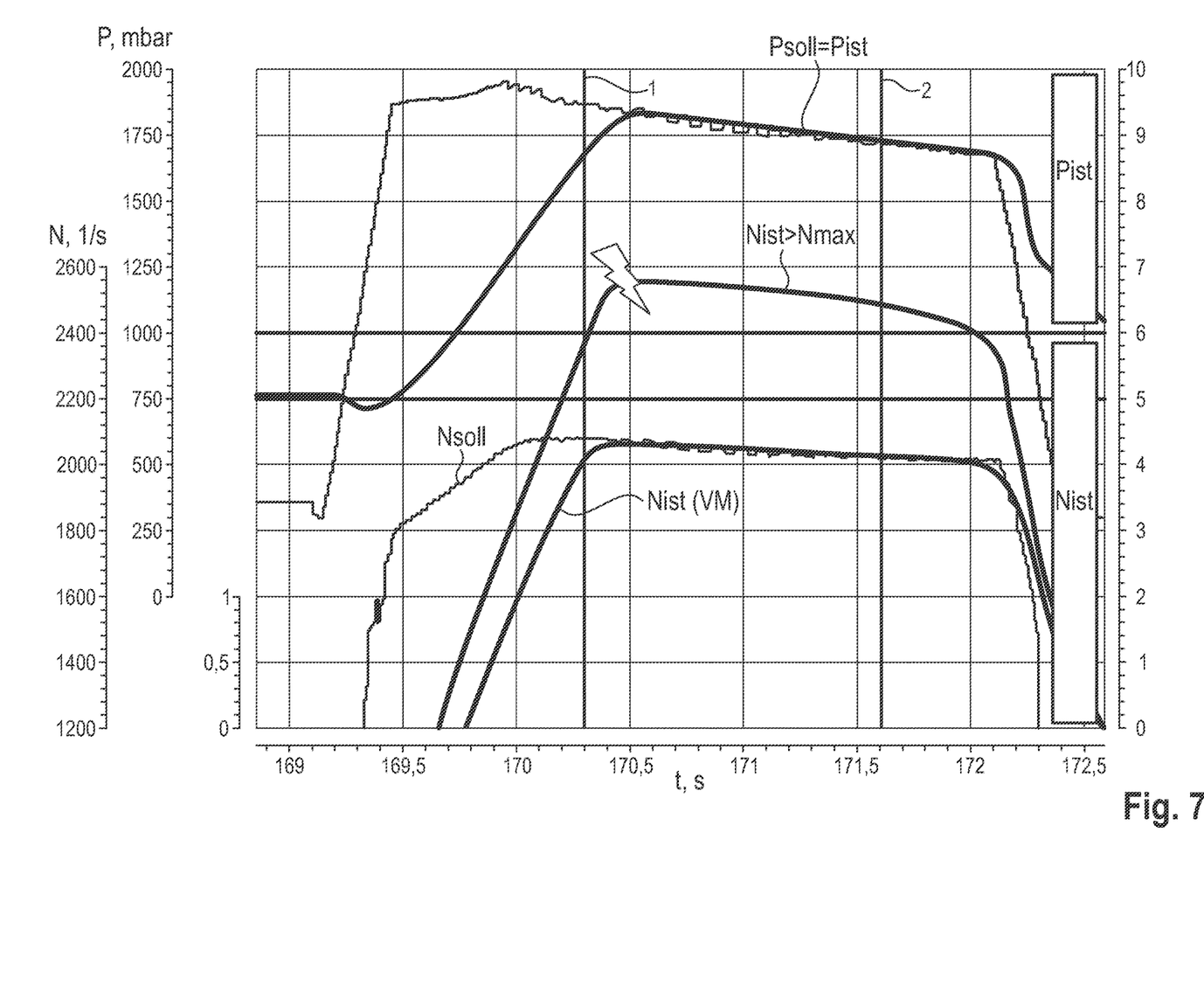
FIG. 7 shows a diagram for a prior art control.

FIG. 7 shows a control without a combination of the actual value within the meaning of the invention, which was taken into account in FIG. 6. In FIG. 7 the controller controls the boost pressure Pist or the speed Nist modeled through the compressor to the desired speed Nsoll and in doing so endangers the turbocharger T beyond the load limit Nist>Nmax.

The turbocharger 100, which can be operated in accordance with a method, represents a further aspect of the invention in addition to the method. As is shown in FIG. 4, according to the invention the turbocharger 100 has a control unit 10 that is designed to control the turbocharger 100 accordingly. It is possible here that the control unit 10 can be implemented in an engine controller 10* of an internal combustion engine or as a separate control unit 10 of the turbocharger 100. Provided in the control unit 10 is a storage device 11 in which can be stored a computer program product that, when at least partially executed in a computing unit 12 of the control unit 10, performs a method that can proceed as described above.

The above description of the figures describes the present invention solely within the framework of examples. Individual features of the embodiments can of course be freely combined with one another insofar as technically appropriate without departing from the scope of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling a speed of a turbocharger that is in operative connection with a compressor, the method comprising:

providing a setpoint value for the speed of the turbocharger on the basis of a model-based pre-control for a calculation of a desired boost pressure ahead of the turbocharger;

determining an actual value for the speed of the turbocharger;

controlling an actuator of the turbocharger to compensate for a difference between the setpoint value and the actual value for the speed of the turbocharger; and providing a main signal and a subsidiary signal during the determination of the actual value for the speed of the turbocharger, wherein the main signal and the subsidiary signal are combined in order to validate the actual value for the speed of the turbocharger, wherein a minimum threshold and a maximum threshold are calculated from the main signal in the determination step, and wherein a leakage factor is produced as a function of the subsidiary signal, the minimum threshold and the maximum threshold.

2. The method according to claim 1, wherein the leakage factor equal to 0 is produced if the subsidiary signal is less than a minimum threshold or wherein the leakage factor equal to 1 is produced if the subsidiary signal is greater than a maximum threshold or wherein the leakage factor is interpolated between 0 and 1 if the subsidiary signal is between the minimum threshold and the maximum threshold.

3. The method according to claim 1, wherein the main signal and the subsidiary signal are combined with the aid of a Kalman filter.

4. The method according to claim 1, wherein a setpoint limiting for the speed of the turbocharger takes place in the provision of the setpoint for the speed of the turbocharger.

5. The method according to claim 1, wherein the actual value for the speed of the turbocharger is captured in the subsidiary signal in the determination step.

6. The method according to claim 1, wherein the actual value for the speed of the turbocharger is provided in the subsidiary signal from a turbine model in the determination step.

7. The method according to claim 1, wherein the actual value for the speed of the turbocharger is provided in the main signal from a compressor model or with the aid of a conversion from a detected actual boost pressure.

8. The method according to claim 1, wherein a same mathematical model and/or same parameters is/are used in operation of the turbocharger for the setpoint for the speed of the turbocharger and for the actual value for the speed of the turbocharger in the main signal.

9. The method according to claim 1, wherein at least one thermodynamic quantity is used as a parameter in operation of the turbocharger, the at least one thermodynamic quantity comprising a temperature ahead of the compressor, a pressure ahead of the compressor, and/or a mass flow of an intake air through the compressor.

10. A turbocharger for operating a compressor having a control unit that is designed to control the operation of the turbocharger in accordance with the method according to claim 1.

11. A computer program product configured to be stored in a storage device of a control unit according to claim 10, wherein the computer program product performs the method when at least partially executed in a computing unit of the control unit.

* * * * *